UNITED STATES PATENT OFFICE.

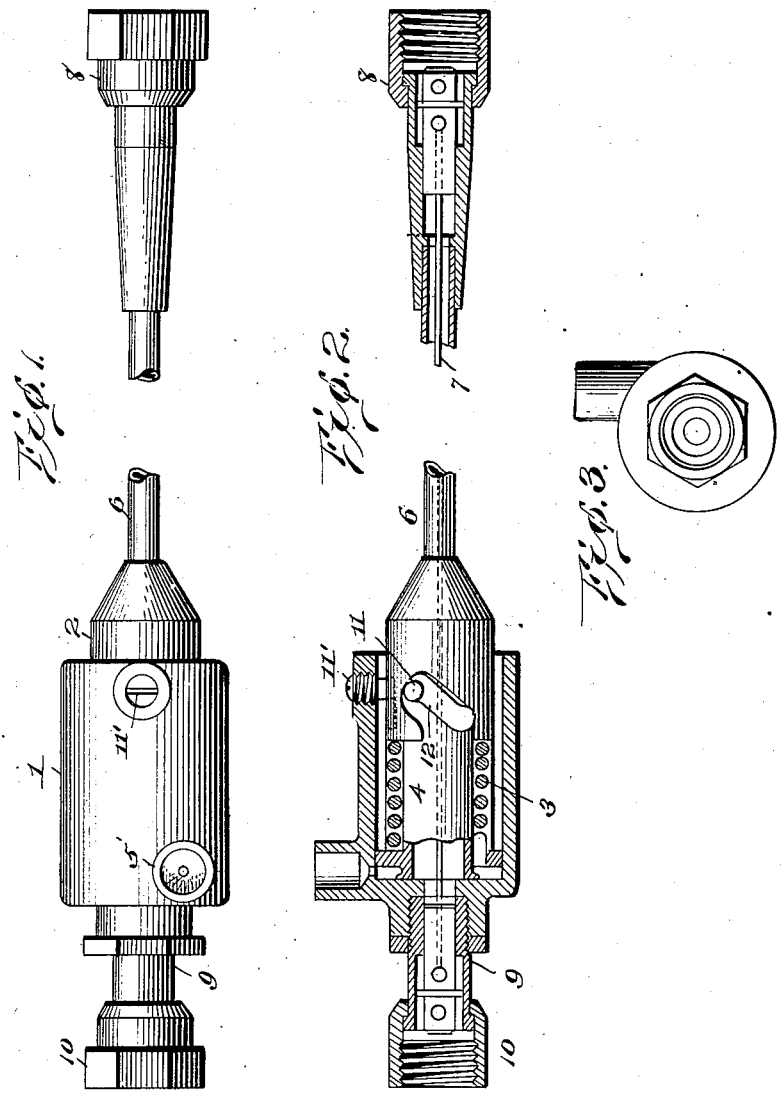

HERBERT O. RUSSELL, OF DETROIT, MICHIGAN, AND CHARLES LEIGH PAULUS, OF DAYTON, OHIO.

CONTROL FOR SYNCHRONIZED GUNS.

Application filed March 9, 1922. Serial No. 542,430.

*To all whom it may concern:*

Be it known that we, HERBERT O. RUSSELL and CHARLES LEIGH PAULUS, citizens of the United States, residing at Detroit and Dayton, in the counties of Wayne and Montgomery and States of Michigan and Ohio, have invented certain new and useful Improvements in Controls for Synchronized Guns, of which the following is a specification.

This invention relates to a control mechanism for synchronized gear of machine guns, the object in view being to provide simple means for the purpose of starting and stopping the fire of a machine gun when operated by a gun control or synchronized gear. The mechanism is especially adapted for a synchronizing gear or gun control in which the impulse is transmitted from the mechanism to the machine gun by a wire cable within a casing. The starting and stopping of the firing operation of the machine gun is accomplished by shortening and lengthening the effective length of the casing relatively to the cable. In case the casing is shortened, enough clearance is allowed both ends of the cable so that the trigger of the machine gun will not be operated.

With the above and other objects in view, the invention consists in the novel construction, combination and arrangement herein fully described, illustrated and claimed.

In the accompanying drawings;

Figure 1 is a broken plan view of the mechanism.

Figure 2 is a diametric section through the same with parts in elevation.

Figure 3 is an end view of the same.

Referring to the drawings, 1 designates a cylindrical housing in which is arranged a sliding sleeve 2 actuated by a spring 3 within the housing 1. Within the sleeve 2 is a rotatable sleeve 4, the rotation of which is produced by means of a Bowden wire control cable running to the control handle or lever (not shown) operated by the gunner. The cable 5 enters the housing 1 through a tubular extension or guide 5' which is disposed tangentially with relation to the center of the housing as shown in Figure 3, the Bowden wire control cable being wrapped around the inner end of the rotatable sleeve 4 which is formed with a groove for that purpose as shown in Figure 2.

Fixed on the sliding sleeve 2 is a tubular casing 6 through which passes the impulse cable 7. On the other end of the casing 6 there is a union nut 8. Upon the end of the housing 1 opposite the sliding sleeve is an adjusting nipple 9 and a union nut 10.

When the Bowden wire control cable 5 is pulled, the sleeve 4 is partially rotated. A pin or stud 11 in one end of the rotating sleeve 4 works in a cam slot 12 and thus imparts to the sleeve 2 a sliding movement outwardly, thereby lengthening the over-all length of the casing 6. One end of the spring 3 is fastened to the rotating sleeve and the other end to the sliding sleeve; consequently when the rotating sleeve is turned, torsion is put upon the spring 3 sufficient to rotate the rotating sleeve 4 back into place and thus shorten the over-all length of the casing when the pull upon the Bowden wire control cable is released. A pointed screw 11' limits the inward and outward movement of the sliding sleeve and also prevents said sleeve from rotating, inasmuch as the union nuts 8 and 9 on both ends of the mechanism are identical, the mechanism may be turned end for end if desired.

Having thus described our invention, we claim:

1. A control for synchronized guns embodying a tubular casing, an impulse cable therein, and means for varying the effective length of said casing relative to said impulse cable, said means comprising a slidable sleeve fastened to one end of the casing, a housing for said sleeve, and means in said housing operable to move said sleeve in the direction of length of the casing.

2. A control for synchronized guns embodying a tubular casing, an impulse cable therein, and means for varying the effective length of said casing relative to said impulse cable, said means comprising a slidable sleeve fastened to one end of the casing, a housing for said sleeve, a rotatable sleeve in said housing cooperating with said slidable sleeve to shift the latter in the direction of length of the casing, and means for rotating said rotatable sleeve.

3. A control for synchronized guns embodying a tubular casing, an impulse cable therein, and means for varying the effective length of said casing, and means for adjusting the primary effective length of the casing relative to said impulse cable.

In testimony whereof we affix our signatures.

HERBERT O. RUSSELL.
CHARLES LEIGH PAULUS.